| United States Patent [19] | | [11] | 4,066,740 |
|---|---|---|---|
| Erickson | | [45] | Jan. 3, 1978 |

[54] METHOD FOR PRODUCING ALUMINA

[75] Inventor: Henry Erickson, Park Forest, Ill.

[73] Assignee: Atlantic Richfield Company, Philadelphia, Pa.

[21] Appl. No.: 205,355

[22] Filed: Dec. 6, 1971

[51] Int. Cl.$^2$ ............................ C01F 7/02; B01J 21/04
[52] U.S. Cl. ..................................... 423/628; 252/463
[58] Field of Search ......................... 423/628; 252/463

[56] References Cited

U.S. PATENT DOCUMENTS

| 2,697,066 | 12/1954 | Sieg | 252/451 X |
|---|---|---|---|
| 3,657,151 | 4/1972 | Noble | 252/437 |

FOREIGN PATENT DOCUMENTS

| 706,356 | 3/1965 | Canada | 423/628 |
|---|---|---|---|

OTHER PUBLICATIONS

Schwarz et al., "Surface Active Agents," 1949, pp. 5–9, 202–205.

*Primary Examiner*—W. J. Shine
*Attorney, Agent, or Firm*—Frank J. Uxa

[57] ABSTRACT

Alumina particles derived from hydrous alumina predominating in α-alumina monohydrate having a crystallite size of less than 100A and having increased porosity can be prepared by a process which comprises forming a mixture of an aqueous slurry of the hydrous alumina and at least one surface active agent, drying this mixture, forming macrosize particles from the dried mixture and calcining the macrosized particles.

14 Claims, No Drawings

METHOD FOR PRODUCING ALUMINA

This invention relates to improved alumina and alumina-based particles. More particularly, the invention relates to the manufacture of alumina and alumina-based particles having improved physical properties and being useful, for example, as catalysts and catalyst supports.

Alumina-based catalysts are useful in many industrial applications, e.g., petroleum reforming and desulfurization, aromatization, paraffin and aromatic hydrocarbon isomerization and the like. In many of these applications the activity of the alumina-based catalyst is directly related to the porosity, i.e., pore volume per unit weight, of the alumina support. Therefore, it would be advantageous to provide alumina and alumina based particles having increased porosity.

Therefore, it is an object of the present invention to produce alumina having increased porosity. Another object of the present invention is to provide means by which the porosity of alumina can be altered and controlled. Additional objects and advantages of the present invention will become apparent hereinafter.

It has now been found that alumina and alumina-based particles derived from hydrous alumina predominating in $\alpha$-alumina monohydrate having a crystallite size of less than 100A units having increased porosity can be prepared by a process which comprises:

1. forming a mixture of an aqueous slurry of the hydrous alumina and at least one surface active agent, the surface active agent being present in the mixture in an amount sufficient to increase the porosity of the calcined alumina hereinafter described;
2. drying said mixture to obtain a solid product which can be formed into macrosize particles;
3. forming said solid product into macrosize particles; and
4. calcining said macrosize particles to form calcined alumina particles having increased porosity.

The mixture formed in step (1) normally contains from about 1% to about 50%, preferably from about 1% to about 16% and more preferably from about 8% to about 14%, by weight of alumina (calculated as $Al_2O_3$). The aqueous slurry of hydrous alumina may be prepared by various methods well known to the art. Thus, for instance, hydrated alumina can be precipitated from an aqueous solution of a soluble aluminum salt, such as aluminum chloride. Ammonium hydroxide is a useful agent for effecting the precipitation. Control of the pH to maintain it within the values from about 7 to about 10 during precipitation is desirable for obtaining a good rate of conversion. Extraneous ions, such as halide ions, which may be introduced in preparing the slurry can, if desired, be removed by filtering the alumina hydrogel, i.e., hydrous alumina, from its mother liquor and washing the filter cake with water.

The present invention is applicable to preparing calcined alumina derived from hydrous alumina predominating in $\alpha$-alumina monohydrate having a crystallite size of less than 100A units. In order to achieve the precursor hydrous alumina predominate in $\alpha$-alumina monohydrate having a crystallite size of less than about 70A units, more preferably less than about 60A units. Particularly outstanding results are achieved when the precursor hydrous alumina predominates in boehmite having a crystallite size in the range from about 10A units to about 60A units. The term "predominates in $\alpha$-alumina monohydrate" as used herein refers to a hydrous alumina wherein more than 50%, preferably at least about 70% and more preferably at least about 95%, by weight of the total alumina hydrate present is $\alpha$-alumina monohydrate. The precursor hydrous alumina may contain minor amounts of other crystalline forms of alumina, e.g., gibbsite, bayerite, norstrandite and the like. Most preferably, however, the precursor hydrous alumina is essentially pure $\alpha$-alumina monohydrate of the proper crystallite size.

The crystallite sizes referred to herein are those determined by conventional x-ray defraction analysis. More specifically, the sizes of the precursor hydrous alumina crystallites referred to herein are those determined by x-ray diffraction techniques on samples dried at approximately 100° C.

The amount of surface active agent present in the mixture of step (1) is effective to increase the porosity of the product calcined alumina. Typically, the surface active agent is present in this mixture in an amount of at least 0.001% by weight based on the total amount of water present, including water of hydration. It is preferred that the surface active agent be present in the mixture of step (1) in an amount within the range from about 0.001% to about 5%, more preferably within the range from about 0.005% to about 1%, by weight based on the total amount of water present.

The drying of the slurry according to step (2) of the present method can be accomplished in various manners — for example, by drum drying, flash drying, spray drying, tunnel drying and the like. The purpose of the drying is to obtain a solid product which has a low enough free moisture content that it is suitable for macroforming, which is the next step in the method. The extent of drying will depend, therefore, on the type of macroforming to be employed. Tabletting, for example, generally requires a drier mix than does, say extruding, which usually calls for a free water content of about 20 to 40 weight percent. The temperature at which the drying is performed is not critical but it is generally preferred to operate at temperatures up to about 400° F. It may be — because of the type of equipment employed, or for whatever reason — that it is preferable to dry the mixture completely, or relatively so, and then add back sufficient water to obtain a formable, e.g., extrudable, mix. Such an operation is within the purview of the instant invention and is intended to be embraced by the recitation: "drying the mixture to obtain a solid product which can be formed into macrosize particles".

Step (3) of the method, forming into macrosize particles, can be performed, for example, by tabletting or extruding the solid product of step (2), as mentioned above. It is customary, especially in the case of tabletting, to incorporate in the mixture minor amounts of a die lubricant which is either nondeleterious to the calcined alumina product or which can be removed by the subsequent calcining step. Often employed, for example, are organic compounds which, by calcining the formed particles in an atmosphere having a controlled amount of oxygen, can be subsequently burned away without giving rise to excessive temperature.

The size selected for the macrosized particles can be dependent upon the intended environment in which the calcined alumina particles are to be used as, for example, whether in a fixed or moving bed reactor system, etc. For example, when these alumina particles are to be used as a catalyst or catalyst support for use in reforming operations employing a fixed bed of catalyst, these particles preferably have a minimum dimension of at least about 0.01 inch and a maximum dimension up to about 0.5 inch or 1 inch or more. Alumina particles having a diameter of about 0.03 inch to about 0.25 inch, preferably from about 0.03 inch to about 0.15 inch are often preferred, especially for use in a fixed bed reforming operation.

Calcining of the macrosize particles according to step (4) of the process is performed at temperatures sufficient to effect release of water of hydration from the particles. Generally suitable are temperatures from about 600° F. to about 1200° F., preferably from about 850° F. to about 1000° F. The calcination can be effected in an oxidizing, reducing or inert atmosphere, the more economical use of a dry air calcining atmosphere being preferred. It is usually advantageous to calcine in a flowing stream of the gaseous atmosphere. Pressure can be atmospheric, super-atmospheric, or sub-atmospheric.

Where the macrosize particles contain significant amounts, say about 5% by weight or more, of uncombined water — as, for example, will usually be the case where the particles have been formed by extrusion — then, either as a separate operation or in the first stage of the calcination, the particles can with advantage first be dried at temperatures below the critical temperatures of water, which is about 705° F. Higher temperatures can cause fissures and rupture of the particles. Thus, prior to the particles being heated to as high as about 700° F., preferably prior to being heated above about 400° F., their uncombined water content should be lowered to at least below about 15% by weight of the composition.

Surface active agents useful in the method of the present invention may generally be defined as those compounds having the ability to lower the tension prevailing at a given phase interface. In many instances, molecules of surface active agents include at least one hydrophobic portion and at least one hydrophilic portion. A wide variety of suitable surface active agents are known to the art and include anionic, cationic and non-ionic materials.

Included among the useful surface active agents are the anionic type exemplified by the alkyl aryl sulfonates and alkenyl aryl sulfonates which contain from about 13 to about 20 carbon atoms per molecule. Alkyl sulfonates and alkenyl sulfonates which contain from about 10 to about 30 carbon atoms per molecule also are suitable as well as ester sulfonates, amide sulfonates, sulfo fatty esters and primary and secondary alkyl sulfates which contain from about 10 to about 30 carbon atoms per molecule.

Useful cationic surface active agents include quaternary ammonium components which contain from about 5 to about 30 carbon atoms per molecule.

Among the nonionic surfactants which are of particular usefulness in the present invention are

$$R—(OC_2H_4)_x—OH$$

and mixtures thereof wherein R is selected from the group consisting of monovalent hydrocarbon radicals containing from about 10 to about 50, preferably from about 14 to about 40, carbon atoms and $x$ is an integer from about 2 to about 50, preferably from about 6 to about 30. Included among the monovalent hydrocarbon radicals are alkyl, such as decyl, tetradecyl, stearyl, and the like; alkenyl such as decenyl, tetradecenyl, oleic and the like; alkaryl and polyalkaryl in which each of the alkyl substituents contains from about 5 to about 18 carbon atoms such as pentyl phenyl, di pentyl phenyl, decyl phenyl, didecyl phenyl, stearyl phenyl, penyl naphthyl, di penyl naphthyl, decyl di-phenyl and the like. In each instance, these radicals may include those non-hydrocarbon substituents which do not materially interfere with the surface active properties of the compound, for example, —OH, —NH$_2$, halide radicals, —SH and the like. These particularly useful nonionic surfactants may be prepared by conventional means, for example, by condensing ethylene oxide with alcohols, alkyl phenols, fatty acids and the like.

Because the ionic surface active agents may contain metal or other ions and may contaminate the final alumina product, it is preferred that the nonionic surface active agents be used when practicing the method of the present invention.

As noted previously, the alumina and alumina based particles prepared by the method of the present invention may be of use as a catalyst and/or catalyst support in various important processes, e.g., hydrocarbon reforming and hydrodesulfurization, hydrocarbon hydrocracking, paraffin and aromatic hydrocarbon isomerization and the like. In order to be useful in certain of these processes, it may be necessary to add other components to the alumina and alumina based particles of the present invention. Procedures for adding these various components to the alumina and alumina based particles are conventional and well known to the art and, therefore, need not be reiterated here.

To illustrate the use of the alumina particles prepared by the method of the present invention as catalyst and catalyst support, a hydrocarbon reforming embodiment is described in detail as follows. In general, hydrocarbon reforming refers to a process whereby hydrocarbon feedstock comprising paraffins and naphthenes is contacted in at least one reaction zone with a catalyst comprising a platinum group metal and alumina in the presence of free molecular hydrogen at hydrocarbon conversion conditions to yield a high octane and/or aromatics-rich product.

A fully compounded hydrocarbon reforming catalyst can be obtained by treating the alumina of the present invention with a platinum group metal component using any one of many conventional methods, such as ion exchange with the alumina, or by impregnation of the alumina at any stage in its preparation and either before or after the calcination referred to in step (4) of the present method. The preferred method for adding the platinum group metal to the alumina involves the use of a water soluble compound of the platinum group metal to impregnate the alumina following the calcination referred to in step (4). For example, platinum can be added to the calcined alumina by co-mingling this alumina with an aqueous solution of chloro platinic acid. The platinum group metals include platinum, palladium, rhodium, ruthenium and the like with platinum being preferred for use in the hydrocarbon reforming catalyst. Generally, the amount of the platinum group metal present in the final reforming catalyst is small compared to the quantities of the other components combined therewith. In fact, the platinum group metal component generally comprises from about 0.05% to about 3%, preferably from about 0.05% to about 1.0%, by weight of the catalyst calculated on an elemental basis. Excellent results are obtained when the catalyst contains from about 0.2% to about 0.9% by weight of the platinum group metal.

Other components may also be included in the hydrocarbon reforming catalyst. Among these added components are metals such as rhenium, germanium, iridium, tin and the rare earth metals such as cerium, with rhenium being preferred. When rhenium is included in the catalyst, it is normally present in an amount from about 0.01% to about 5%, preferably from about 0.05% to about 1.0%, by weight calculated as the elemental metal. The rhenium component may be incorporated into the catalyst in any suitable manner and at any stage in the preparation of the catalyst. For example, the procedure for incorporating the rhenium component may involve the impregnation of the alumina either before, during or after the time the platinum group metal is added. This impregnation may take place by co-mingling the alumina with an aqueous solution of a suitable rhenium salt such as ammonium perrhenate and the like or an aqueous solution of perrhenic acid.

The fully compounded hydrocarbon reforming catalyst may also include a halogen component. This combined halogen may be flourine, chlorine and bromine and mixtures thereof with flourine and particularly chlorine being preferred for the purposes of the present invention. The halogen may be added to the alumina in any suitable manner either during preparation of the alumina or before or after the addition of the catalytically active metallic components described previously. In any event, if the halogen is included, it is added in such a manner as to result in a fully composited catalyst that contains from about 0.1% to about 1.5%, preferably from about 0.6% to about 1.3% by weight of halogen calculated on an elemental basis.

When using the hydrocarbon reforming catalyst as prepared above, the hydrocarbon reforming system may comprise a reforming zone containing at least one fixed bed of catalyst previously characterized. This reforming zone may be one or more separate reactors with suitable heating means there between to compensate for the net endothermic nature of the reactions that take place in each catalyst bed. The hydrocarbon feed stream that is charged to the reforming system may comprise hydrocarbon fractions containing naphthenes and paraffins that boil within the gasoline range. Typically, the hydrocarbon feed stream may comprise from about 20% to about 70% by weight of naphthenes and from about 25% to about 75% by weight of paraffins. The preferred charge stocks are those consisting essentially of naphthenes and paraffins, although in some cases aromatics and/or olefins may also be present. When aromatics are included in the hydrocarbon charge stock, these compounds comprise from about 5% to about 25% by weight of the total hydrocarbon charge stock. A preferred class of charge stocks includes straight run gasolines, natural gasolines, synthetic gasolines and the like. On the other hand, it is frequently advantageous to charge thermally or catalytically cracked gasolines including hydrocracked material or higher boiling fractions thereof, called heavy naphthas. Mixtures of straight run and cracked gasolines can also be used to advantage. The gasoline charge stock may be a full boiling range gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha — for example, a naphtha boiling in the range of about $C_7$ to about 400° F. In some cases, it is also advantageous to charge pure hydrocarbons or mixtures of hydrocarbons that have been extracted from hydrocarbon distillates — for example, a straight-chain paraffin — which are to be converted to aromatics. It is preferred that these charge stocks be treated by conventional pretreatment methods, if necessary, to remove substantially all sulfurous and nitrogenous contaminants therefrom.

In hydrocarbon reforming, reaction pressure in the range from about 50 psig. to about 1,000 psig., preferably from about 100 psig. to about 600 psig. is employed. Reforming operations may be conducted in the more preferably pressure range from about 100 psig. to about 400 psig. For optimum reforming results, the temperature in the reaction zone should preferably be within the range from about 700° F. to about 1100° F., more preferably in the range from about 800° F. to about 1050° F. The initial selection of the temperature within this broad range is made primarily as a function of the desired octane of the final reformate considering the characteristics of the chargestock and of the catalyst. The temperature may then be slowly increased during the run to compensate for the inevitable deactivation that occurs to provide a constant octane product. In accordance with the hydrocarbon reforming processes sufficient hydrogen is supplied to the reaction zone to provide from about 2.0 to about 20 moles of hydrogen per mole of hydrocarbon entering the reaction zone with excellent results being obtained when from about 7 to about 10 moles of hydrogen are supplied per mole of hydrocarbon chargestock. Likewise, the weight hourly space velocity, i.e., WHSV, used in reforming may be in the range from about 0.5 to about 10.0 with a value in the range from about 2.0 to about 5.0 being preferred.

The following examples illustrate more clearly the method of the present invention. However, these illustrations are not to be interpreted as specific limitations on this invention.

EXAMPLE 1

A water-hydrous alumina mixture was formed which contained 8.9% of alumina (calculated as $Al_2O_3$). The hydrous alumina used was a high purity boehmite which had an average crystallite size of 40A. A commercially available liquid, low foaming, nonionic surface active agent having the following structural formula

wherein R is an alkyl phenol radical containing an average of about 18 carbon atoms and $x$ is an integer having an average value of about 20 was added to this mixture such that this surface active agent amounted to 0.0095% by weight of the total water present in the mixture. This mixture was stirred at room temperature until completely uniform and then spray dried at a gas outlet temperature of about 310° F. The spray dried product was made up of alumina hydrate particles, i.e., microspheres, of sizes ranging from about 10 microns to about 100 microns.

A sample of product A, i.e., 1700 grams, and 1250 ml. of water were mulled in a Simpson Intensive Mixer for a sufficient length of time to insure a completely uniform mixture. The mixture was then extruded through a 1/16 inch die plate using a double auger extruder. The extruded product was dried for about 24 hours at 250° F. in a forced draft oven. The dried product was then broken into particles about ¼ inch in length and screened free of fines. The dried product was then calcined in an electric muffle furnace using an automatic controller to give a temperature rise of 300° F./hour to 1050° F., a 3 hour holding time at 1050° F. and rapid cooling to yield a first extruded product. The total pore volume of this extruded product, as measured by an He/Hg porosimeter, was 0.468 ml./gm.

A second extruded product was prepared in the same manner as above except that no surface active agent was employed. The total pore volume of this product was only 0.421 ml./gm. Therefore, the first extruded product had about 11.2% more total pore volume than the second extruded product.

EXAMPLE 2

This example illustrates an alternate method for preparing the hydrous alumina for further processing by the method of the present invention. A solution of 25 lbs. of $AlCl_3.6H_2O$ in 51 liters of deionized water is formed. 20 liters of ammonium hydroxide solution containing equal volumes of water and 0.90 specific gravity ammonium hydroxide is added to the previously formed mixture. Approximately 35 minutes elapsed time is used to effect this addition. After additional stirring, a precipitate is separated in a plate and frame press to form a firm cake. This cake is broken up into approximately 1 inch cubes and is placed into a vessel of deionized water and washed by perculation, i.e., running deionized water past the cake at about 20 gallons per hour. Washing is continued for approximately 100 hours.

X-ray diffraction patterns of the resulting hydrous alumina samples indicate this product to be approximately 95% boehmite having a crystallite size in the range from about 30A to about 50A, plus a smaller amount of gibbsite.

Using this hydrous alumina, a water hydrous alumina mixture is formed which contains about 9.0% by weight of alumina (calculated $Al_2O_3$). The same commercially available surface active agent used in Example 1 is added to the water hydrous alumina mixture such that the surface active agent amounts to about 0.01% by weight of the total amount of water in the mixture. This mixture is stirred at room temperature until completely uniform and then is spray dried at a gas outlet temperature of about 310° F. This spray dried product is made up of alumina hydrate particles of sizes ranging from about 10 microns to 100 microns.

Using these spray dried particles in a procedure similar to that given in Example 1, an extruded product is prepared. An additional extruded product is prepared in an identical manner except that no surface active agent is employed. It is found that the extruded product produced using the surface active agent has about 11% more total volume than the extruded product prepared using no surface active agent.

The alumina and alumina-based particles having increased pore volume obtained by the method of the present invention when used as catalyst or catalyst supports in many instances provide improved performance, e.g., catalytic activity.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. A method for producing calcined alumina having increased porosity which comprises:
    1. forming a mixture of an aqueous slurry of hydrous alumina and at least one surface active agent, said hydrous alumina predominating in α-alumina monohydrate having a crystallite size of less than 100A, the molecules of said surface active agent comprising at least one hydrophobic portion and at least one hydrophilic portion, said hydrous alumina being present in the mixture in an amount from about 8% to about 14% by weight (calculated as $Al_2O_3$) of the total mixture and said surface active agent being present in the mixture in an amount of from about 0.001% to about 1% by weight based on the total amount of water present in said mixture, including the water of hydration, sufficient to increase the porosity of the calcined alumina hereinafter described;
    2. drying said mixture to obtain a solid product which can be formed into macrosized particles;
    3. forming said solid product into macrosized particles, said particles upon calcination having a minimum dimension of at least about 0.01 inch; and
    4. calcining said macrosized particles to form calcined alumina having increased porosity.

2. The method of claim 1 wherein at least 70% by weight of the total alumina hydrate present in the mixture formed in step (1) is α-alumina monohydrate having a crystallite size of less than about 70A.

3. The method of claim 2 wherein at least 95% by weight of the total alumina hydrate present in the mixture formed in step (1) is α-alumina monohydrate having a crystallite size of less than about 70A.

4. The method of claim 1 wherein said surface active agent is nonionic.

5. The method of claim 2 wherein said surface active agent is nonionic.

6. The method of claim 3 wherein said surface active agent is nonionic.

7. The method of claim 4 wherein said surface active agent is selected from the group consisting of $$R-(OC_2H_4)_x-OH$$

and mixtures thereof wherein R is selected from the group consisting of monovalent hydrocarbon radicals containing from about 10 to about 50 carbon atoms and x is an integer from about 2 to about 50.

8. The method of claim 5 wherein said surface active agent is selected from the group consisting of $$R-(OC_2H_4)_x-OH$$

and mixtures thereof wherein R is selected from the group consisting of monovalent hydrocarbon radicals containing from about 10 to about 50 carbon atoms and x is an integer from about 2 to about 50.

9. The method of claim 6 wherein said surface active agent is selected from the group consisting of $$R-(OC_2H_4)_x-OH$$

and mixtures thereof wherein R is selected from the group consisting of monovalent hydrocarbon radicals containing from about 10 to about 50 carbon atoms and x is an integer from about 2 to about 50.

10. The method of claim 6 wherein said surface active agent is selected from the group consisting of

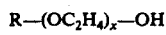

and mixtures thereof wherein R is selected from the group consisting of monovalent hydrocarbon radicals containing from about 14 to about 40 carbon atoms and x is an integer from about 6 to about 30.

11. In a process for preparing an alumina extrudate which includes the steps of forming a hydrous alumina, filtering and washing the alumina, partially drying the washed alumina, preparing an extrusion mix of the partially dried alumina, extruding the extrusion mix thus prepared, and thereafter drying and calcining the extrudates, the improvement which comprises adding to the alumina being processed from about 0.006% to 11.4% by weight, based on weight of alumina ($Al_2O_3$), of a water soluble surface active agent of the cationic, anionic and nonionic types, said addition being made at a point subsequent to washing but prior to extruding the alumina.

12. The process of claim 11 wherein the alumina is partially dried by oven drying and the surface active agent is added prior to said drying.

13. In a process for preparing an alumina extrudate which includes the steps of forming a hydrous alumina, partially drying the alumina, preparing an extrusion mix of the partially dried alumina, extruding the extrusion mix thus prepared, and thereafter drying and calcining the extrudates, the improvement which comprises adding to the alumina being processed from about 0.006% to 11.4% by weight, based on weight of alumina ($Al_2O_3$), of a water soluble surface active agent, said addition being made at a point subsequent to forming the alumina but prior to extruding the alumina.

14. The process of claim 13 wherein the alumina is partially dried by oven drying and the surface active agent is added prior to said drying.

* * * * *